United States Patent

Hara et al.

Patent Number: 5,675,422
Date of Patent: Oct. 7, 1997

[54] FACSIMILE APPARATUS

[75] Inventors: Masato Hara; Nobuyuki Hirai, both of Yokohama, Japan

[73] Assignee: Canon Kabushiki Kaisha, Tokyo, Japan

[21] Appl. No.: 261,202

[22] Filed: Jun. 15, 1994

Related U.S. Application Data

[63] Continuation of Ser. No. 808,642, Dec. 17, 1991.

[30] Foreign Application Priority Data

Dec. 20, 1990 [JP] Japan ................... 2-404333

[51] Int. Cl.⁶ ............................................. H04N 1/00
[52] U.S. Cl. .................... 358/404; 358/434; 358/437
[58] Field of Search ............................... 358/444, 404, 358/434, 468, 441, 437, 439, 440, 403; 364/425; 395/873, 877, 250, 884

[56] References Cited

U.S. PATENT DOCUMENTS

| | | | |
|---|---|---|---|
| 4,280,193 | 7/1981 | Baun et al. | 395/884 |
| 4,587,633 | 5/1986 | Wang et al. | 358/403 |
| 4,805,094 | 2/1989 | Oye et al. | 395/250 |
| 4,827,349 | 5/1989 | Ogata et al. | 358/442 |
| 4,900,902 | 2/1990 | Sakakibara | 358/468 |
| 5,001,744 | 3/1991 | Nishino et al. | |
| 5,016,114 | 5/1991 | Sakata et al. | 358/404 |
| 5,032,923 | 7/1991 | Kurtin et al. | 358/444 |
| 5,038,226 | 8/1991 | Nagaishi | 358/404 |
| 5,124,790 | 6/1992 | Nakayama | 358/261.2 |
| 5,163,088 | 11/1992 | LoCascio | 358/444 |
| 5,163,132 | 11/1992 | DuLac et al. | 395/873 |
| 5,185,821 | 2/1993 | Yoda | 358/403 |
| 5,196,947 | 3/1993 | Takahashi | 358/444 |
| 5,267,048 | 11/1993 | Hirai . | |

FOREIGN PATENT DOCUMENTS

| | | | |
|---|---|---|---|
| 122170 | 7/1984 | Japan | H04N 1/00 |
| 62-274 | 8/1986 | Japan | H04N 1/21 |
| 106575 | 8/1989 | Japan | H04N 1/21 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

In a facsimile system received data is initially stored in an internal storage device, and subsequently is stored in an external storage device (hard disk drive or floppy disk drive) by a transfer process. The facsimile system stores the received data from a transmitting party in the internal storage device and determines a state of availability of the external storage device. When the external storage deice is available, the received data is transferred to the external storage device, and if not available, transfer is delayed until it becomes available.

13 Claims, 5 Drawing Sheets

FACSIMILE APPARATUS

This application is a continuation of application Ser. No. 07/808,642 filed Dec. 17, 1991.

BACKGROUND OF THE INVENTION

1. Field of the Invention

The Present invention relates to facsimile apparatus, and more particularly, to a facsimile apparatus having a detachable external storage medium.

2. Description of the Prior Art

In the prior art, this type of apparatus (referred to as FAX) includes a storage medium. Image information transmitted over a transmissions line can be received without the use of recording paper by storing the image information in the storage medium. It is known that, detachable external storage mediums such as a floppy disk are used so that management and transaction of image data can be performed by an individual operator. Further, a control method in which a plurality of functions are simultaneously performed is generally utilized.

However, in the prior art, when functions other than reception occupy the external storage medium and it is not available, incoming information often cannot be received when it arrives.

SUMMARY OF THE INVENTION

It is a primary object of the present invention is to provide a facsimile apparatus which eliminates the drawback in the above-described prior art.

Another object of the present invention is to provide a facsimile apparatus which can receive information regardless of the state of availability of an external storage device.

It is still another object of the present invention to provide facsimile apparatus comprising reception means for receiving data, internal storage means for storing the data received by the reception means, external storage means for storing the received data stored in the internal storage means, and transfer means for performing a transfer process on the received data stored in the internal storage means to the external storage means, wherein the transfer means is capable of determining a state of availability of the external storage means, of executing the transfer of process data in case the external storage means is available, and of holding the transfer process when the external storage means is not available.

Still another object of the present invention is to provide a facsimile apparatus comprising a reception means for receiving data from a sending party, internal storage means for storing the data received by the reception means, external storage means for storing the received data stored in the internal storage means, detecting means for detecting an incoming call from a sending party, transfer means for starting to perform a transfer process on the received data stored in the internal storage means to the external storage means in case the incoming call is detected, with the transfer means being capable of determining a state of availability of the external storage means, of performing a transfer process when the external storage means is available, and of holding the transfer process when the external storage means is not available.

Other features and advantages of the present invention will be apparent from the following description taken in conjunction with the accompanying drawings, in which like reference characters designate the same or similar parts in the figures thereof.

DESCRIPTION OF THE PREFERRED EMBODIMENTS

Preferred embodiments of the present invention are described with reference to the drawings.

[First Embodiment]

Figure 1:
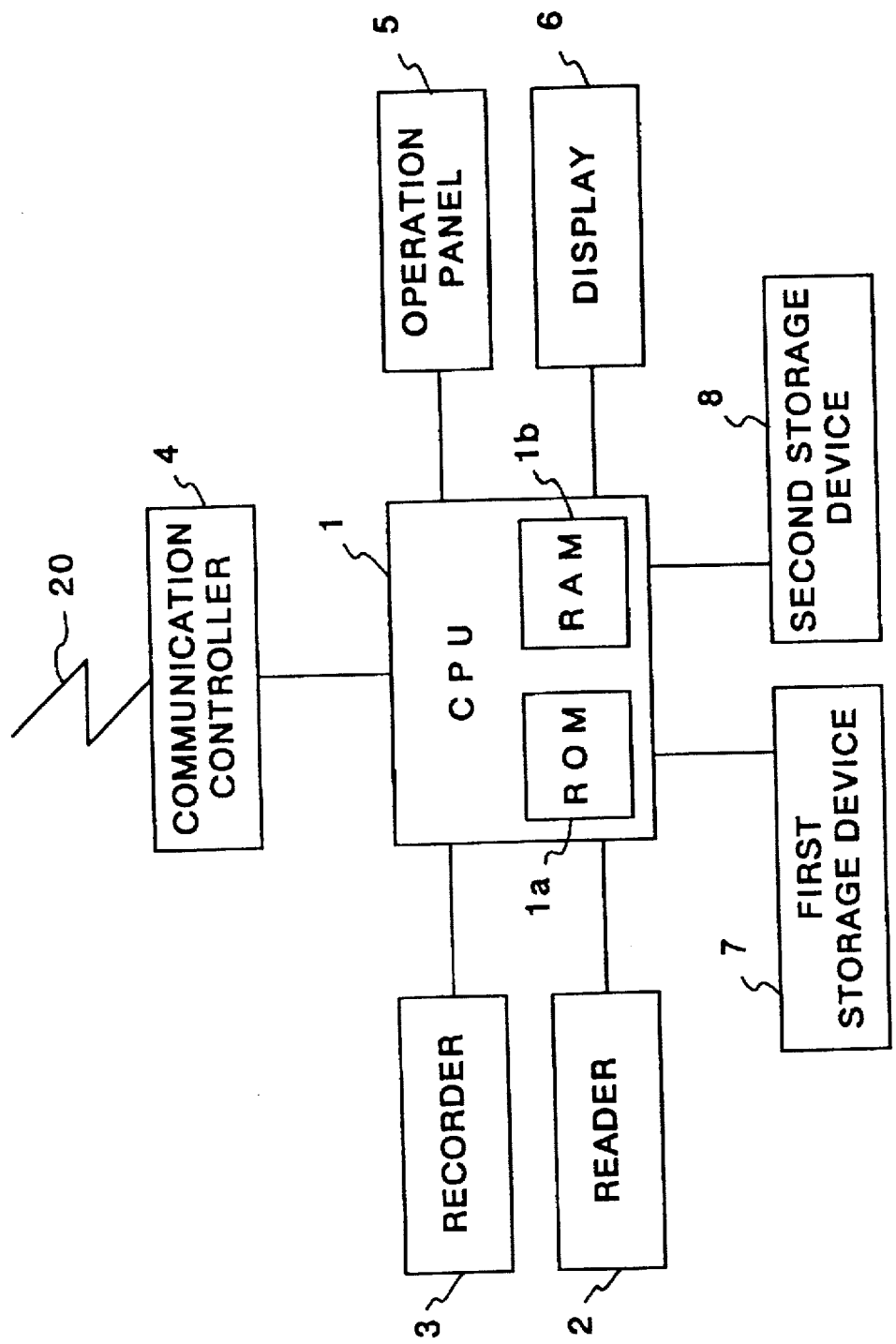
FIG. 1 is a block diagram which illustrates a structure of a facsimile apparatus in a first embodiment according to the present invention.

FIG. 1 is a block diagram which shows a structure of a facsimile apparatus of a first embodiment of the present invention.

Referring to FIG. 1, reference numeral 1 denotes a central processing unit (CPU) which controls the other apparatus in the drawing. Reference numeral 1a denotes a ROM which stores programs corresponding to the flowcharts shown in FIG. 2 and FIG. 3, according to which CPU 1 can operate. Reference numeral 1b denotes a RAM which is used as a work area for various types of programs. Still referring to FIG. 1, reference numeral 2 denotes a reader comprising a charge coupled device (CCD) image sensor, an original transfer system, or the like. Reference numeral 3 denotes a recorder such as thermal printer or laser printer, and reference numeral 4 denotes a communication controller comprising a modem, a network control unit (NCU) and so on. Switched lines 20 and communication lines of a telephone system (not shown in the figures) are connected to the communication controller 4.

Reference numeral 5 denotes an operation panel comprising a keyboard for setting destinations and other facsimile functions. Reference numeral 6 is a display comprising a liquid crystal device (LCD), a light emitting diode (LED), or the like. Reference numeral 7 is a first storage device, an internal storage of dynamic RAM (DRAM), which stores registered data and image data used by the CPU 1. The first storage device comprises a memory like RAM 1b, and its area can be divided for various purposes. Reference numeral 8 denotes a second storage device which is used for similar purposes to the first storage device 7. The second storage device 8 is a non-volatile storage medium an external storage such as floppy disk drive (FDD) or hard disk (HDD) drive comprising a storage medium which does not lose data even when a power supply is cut off.

The operation of this embodiment of the invention is described below.

Figure 2:
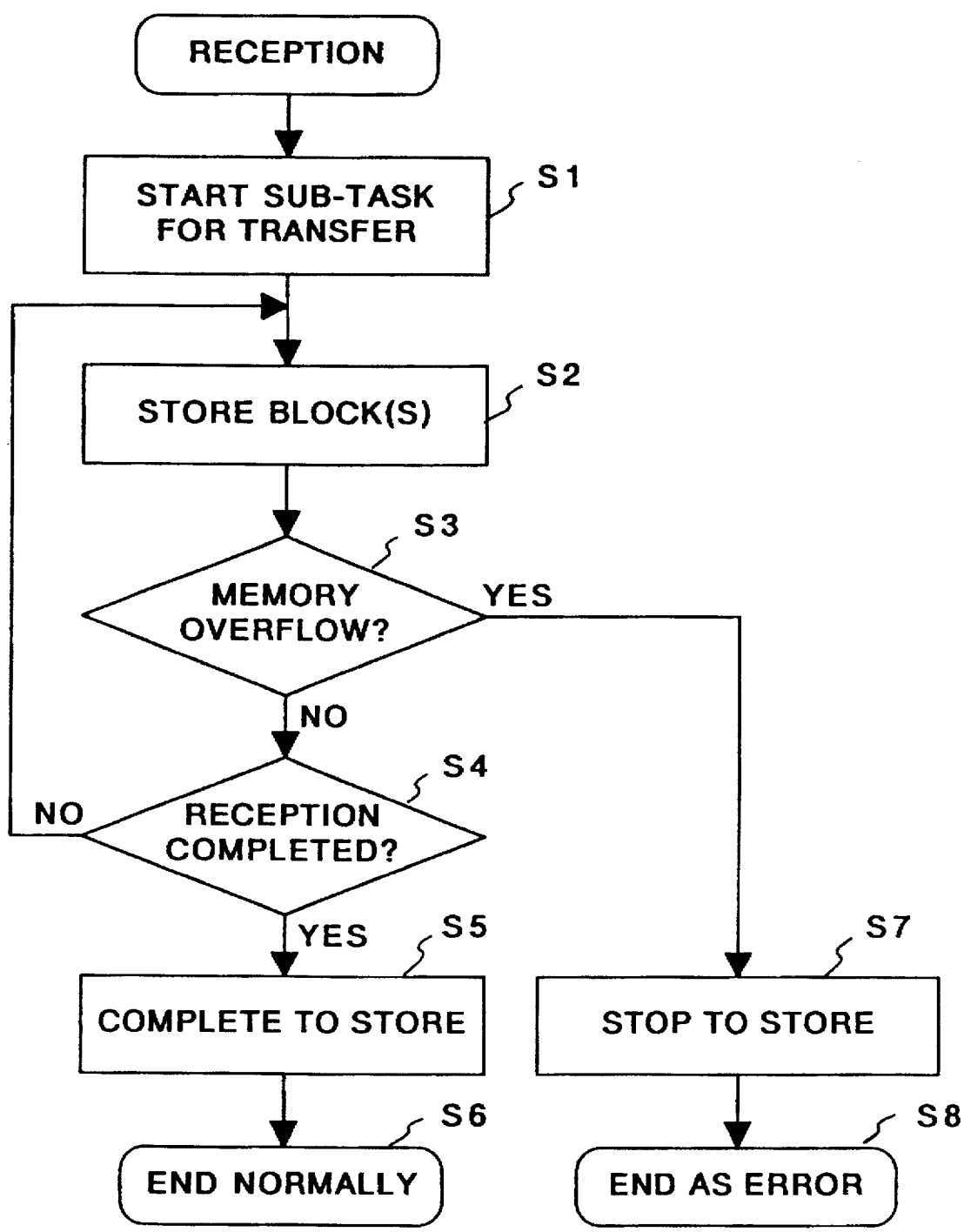
FIG. 2 is a flowchart which illustrates a reception operation in the first embodiment.
Figure 3:
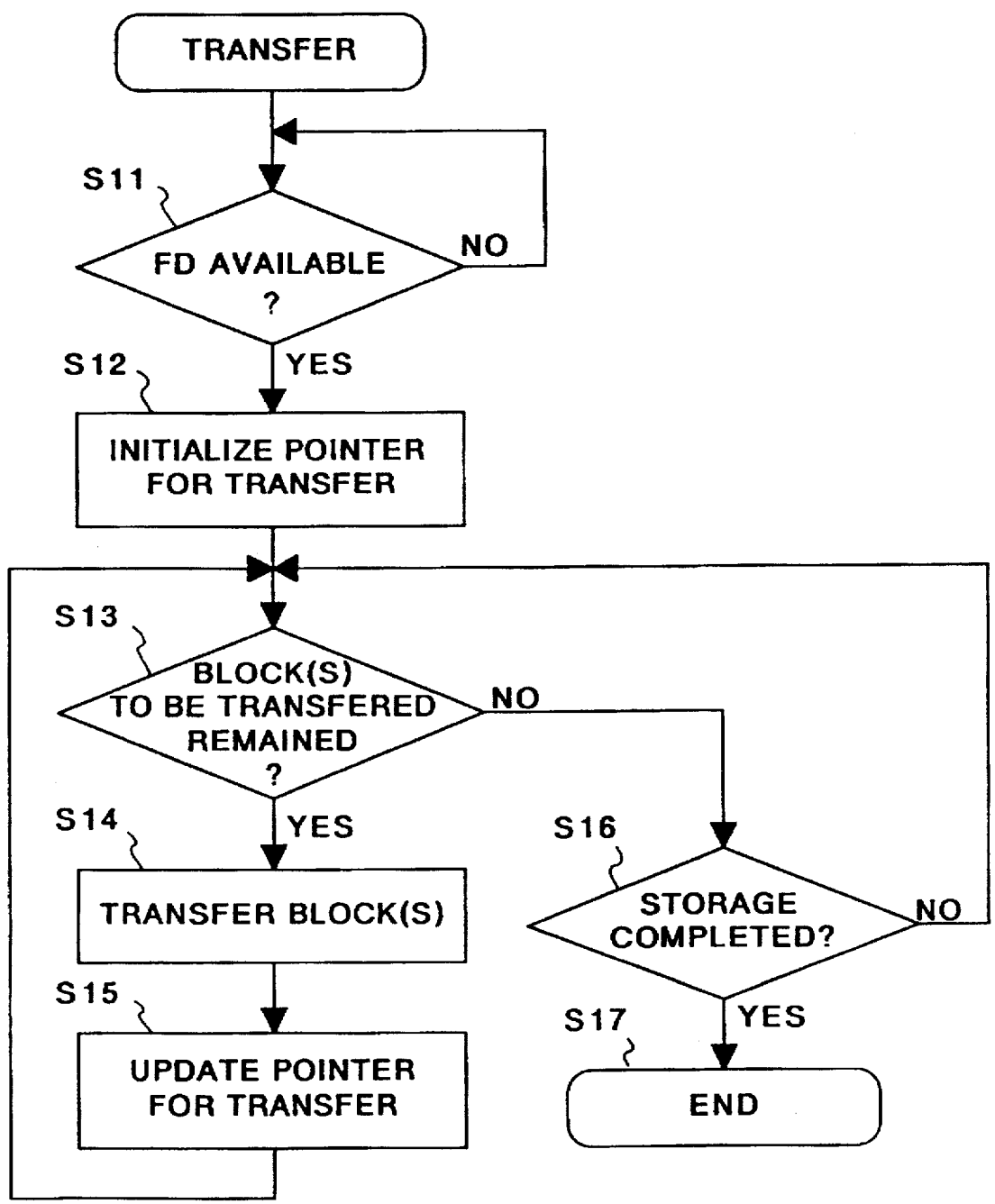
FIG. 3 is a flowchart which illustrates a sub-task of the task shown in FIG. 2.

FIG. 2 is a flowchart which illustrates an operation of information reception according to the embodiment of FIG. 1. FIG. 3 is a flowchart which illustrates a sub-task started by the operation shown in FIG. 2. The flowchart in FIG. 2, however, only shows the reception of image information and an explanation for a procedure of the communication is omitted, since it is well-known. Programs shown in FIG. 2 and FIG. 3 can be programs which may be processed simultaneously as separate tasks.

First, referring to FIG. 2, after detecting an incoming call from a sending party, a transfer process to the second storage device 8 is started as a sub-task in step S1. Then, image information received in step S2 is stored in the first storage device 7 in a block-unit basis. When memory in the first storage device 7 is detected as being in an overflow state in step S3, storing of the information in the memory is stopped (step S7) and the process is ended as an error (step S8). On the other hand, when memory in the unit 7 is not detected as being in an overflow state in step S3, a determination is made whether or not the reception has been completed in step S4. When the reception is incomplete, a return is made to step 2 and the above-described operation is repeated. On the other hand, when the information has been determined to have been completely received in step S4, the storing of information in the first storage device 7 is completed in step S5, and then, the process of communication is normally ended in step S6.

Referring to FIG. 3, a state of availability of the second storage device 8 is determined in step S11. When the second storage device 8 is not available for reasons such that it is being formatted or that the stored data is being read, step S11 is repeated until the second storage device 8 becomes available. When the second storage device 8 becomes available in step S11, the process proceeds to step S12, and a pointer for transfer is initialized as an address in a leading block. Then, in step 13 a determination is made as to whether or not blocks to be transferred remain in storage device 8. Any blocks that remain are transferred in step S14. After a content of the pointer is updated in step S15, a loop returning to step S13 is repeated. On the other hand, when no block remains for transfer at step S13, the process proceeds to step S16. Then, whether information storage in the first storage 7 is completed is determined as a task of the receiving party. When the aforementioned storage is completed, a task of the transmitting party is ended, at step 17 where as if it is not completed, a return is made to step S13 and step S16 is repeated.

As described above, this embodiment is capable of receiving information regardless of a state of availability of the external storage device at the receiving party, and of improving the reliability of the facsimile apparatus.

[Second Embodiment]

Referring to FIG. 3, in step S11, the present invention is capable of activating an alarm and/or displaying/recording (printing) a message responding to needs by the display 6 and/or the recorder 3 when the second storage device 8 is not available. For example, a floppy disk is not inserted, or the like. Of course, the above-mentioned alarm and message can be sent to other terminals through the line 20 as well as to the display 6 and the recorder 3.

[Third Embodiment]

In the above-described embodiments, it has been explained that the first storage device 7 and the second storage device 8 are DRAM and FD respectively. However, it is to be understood that the invention is not limited to the specific storage mediums, and is able to apply to other storage mediums such as a optical disk for data storage.

[Fourth Embodiment]

In the first embodiment, the programs (tasks) corresponding to the flowcharts in FIG. 2 and FIG. 3 can be started simultaneously or separately. Then, the method shown in FIG. 2 starts the transfer task as a sub-task in case incoming information is arriving. In addition to this method, another method (the fourth embodiment) performs a transfer operation (sub-task) of information to the second storage device 8 after the information has been stored in the first storage device 7.

Figure 4:
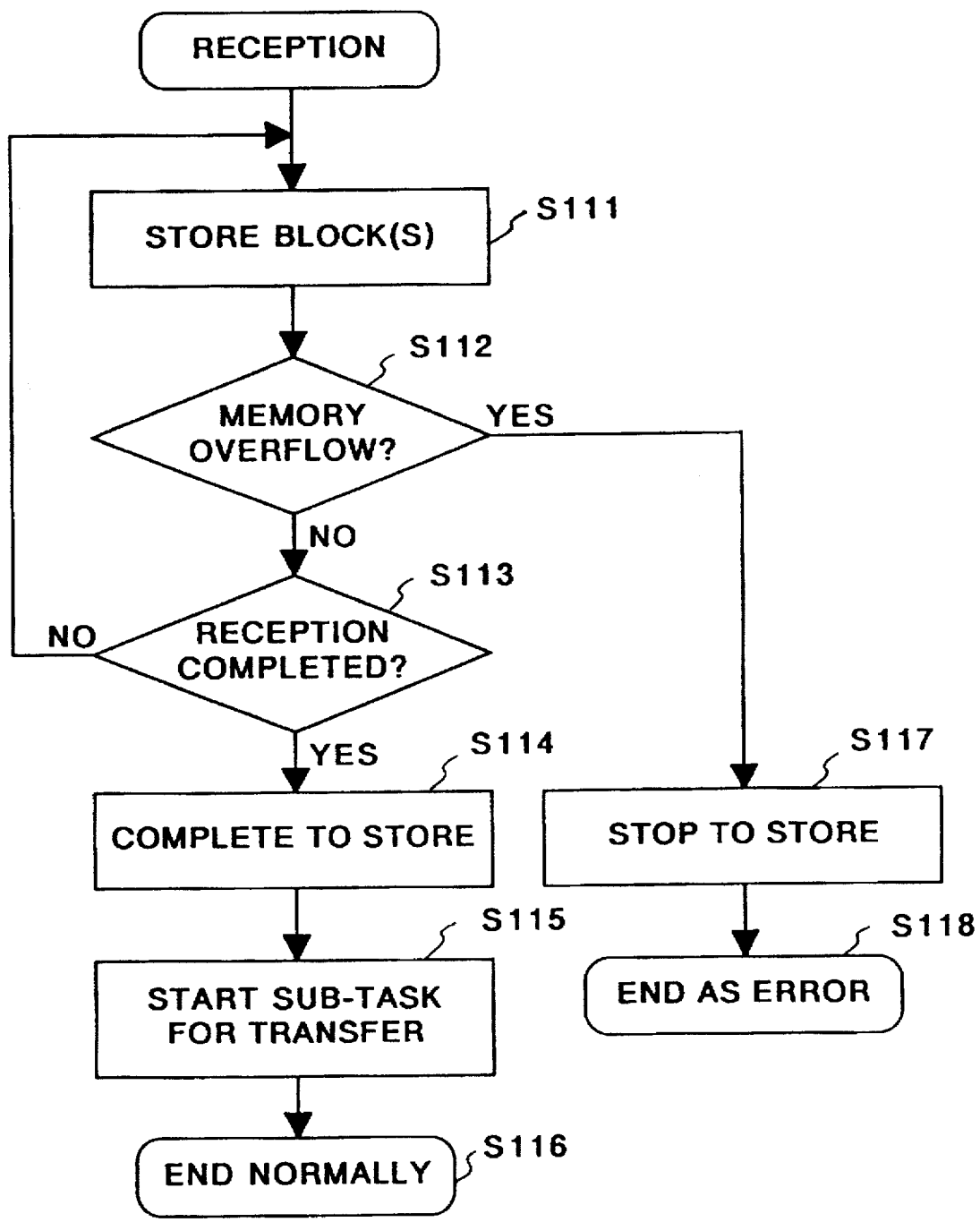
FIG. 4 is a flowchart which illustrates a reception operation in a fourth embodiment.

FIG. 4 is a flowchart which illustrates an operation of receiving information in the fourth embodiment.

The procedure in the flowchart of FIG. 4 is similar to that of FIG. 2 except for step S1 of FIG. 2 being transferred between step S5 and step S6 in FIG. 2. Steps S111–S114 in FIG. 4 correspond to steps S2–S5 in FIG. 2. Step S115 in FIG. 4 corresponds to step S1 in FIG. 2, and steps S116–S118 in FIG. 4 correspond to steps S6–S8 in FIG. 2 respectively. Since the process in each step in FIG. 4 is same as one of the first embodiment, an explanation is omitted here.

[Fifth Embodiment]

In the aforementioned first to fourth embodiments, a transfer task (See FIG. 3) is performed before or after the information has been received. However, the present invention is not limited to these specific embodiments. The transfer task can also be applied when a state of availability in the first storage device 7 is checked all the time during the information receiving period. Then, errors can be avoided in that a transfer task (See FIG. 3) is automatically executed before the first storage device 7 overflows.

Figure 5:
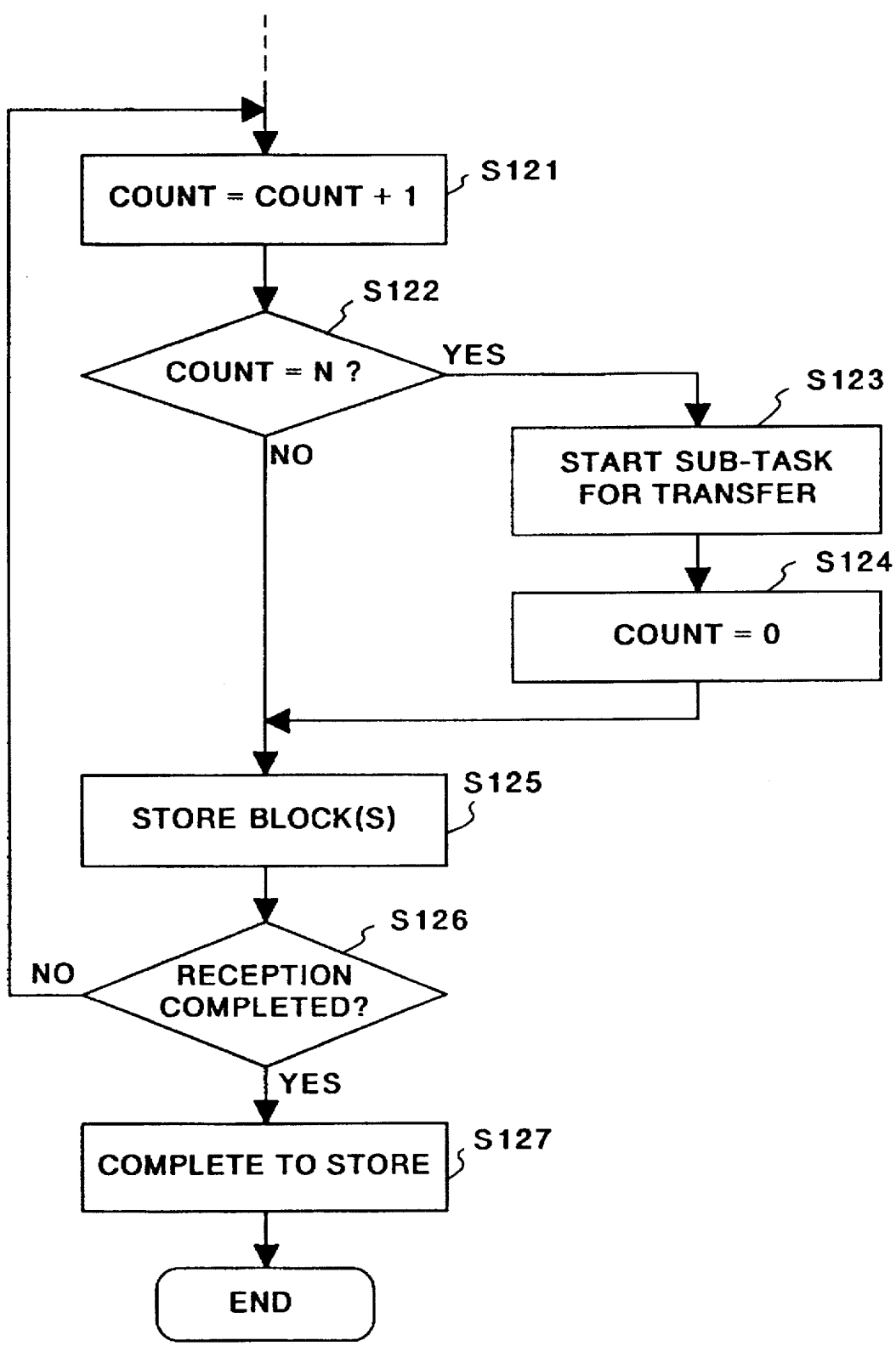
FIG. 5 is a flowchart which illustrates a reception operation in a fifth embodiment.

FIG. 5 is a flowchart which illustrates a reception operation of the fifth embodiment.

In this embodiment, a number (N) of blocks, which is less than a number of blocks in which the first storage can store, is predetermined as a threshold. When a count (COUNT) of received blocks has reached this threshold, a task for a transfer process is started. COUNT, a parameter, which indicates the number of blocks stored, is sequentially counted up from 1.

In FIG. 2, the transfer task is immediately started before a reception operation. In the fifth embodiment, however, COUNT is increased by one in step 121, as shown in FIG. 5. Then whether the COUNT has reached the threshold (N) is determined in step S122. When the COUNT has reached the threshold, a task for transfer shown in FIG. 3 is started in step S123. At that time, the COUNT is reset to 0 in step S124. Thus, a transfer control is performed so that the first storage device 7 does not overflow. On the other hand, when the COUNT has not reached the threshold (N), the process proceeds to step S125 where storage of received information on block-by-block basis is performed.

Since steps S125–S127 are same as the steps in FIG. 3, an explanation on each step is omitted. However, it should be noted that the processes of the steps from S121 is repeatedly performed until reception is completed as determined at step S126. There may be various types of errors which occur at the time of reception, however, an explanation of how to correct those errors is omitted here.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:

reception means for receiving data from a sending party;

internal storage means, having a plurality of block areas each capable of storing a block of data, for storing the data continuously received by said reception means into respective block areas as blocks of data;

external storage means for storing the received data stored in said internal storage means;

determination means for determining whether or not a predetermined number of blocks of data has been stored in said internal storage means, where the predetermined number is less than a number of said block areas; and transfer means for transferring the received data stored in said internal storage means to said external storage means, wherein said transfer means starts the transfer operation when said determination means determines that the predetermined number of blocks of data has been stored in said internal storage means, and wherein said reception means receives the data from the sending party during the transfer operation.

2. A facsimile apparatus according to claim 1, wherein said external storage means is detachable from said facsimile apparatus.

3. A facsimile apparatus according to claim 1, wherein said external storage comprises a non-volatile storage medium.

4. A facsimile apparatus comprising:

reception means for receiving data from a sending party;

a RAM, having a plurality of block areas each capable of storing a block of data, for storing the data continuously received by said reception means into respective block areas as blocks of data;

a floppy disk for storing said blocks of data stored in said RAM;

determination means for determining whether or not a predetermined number of blocks of data has been stored in said RAM, where the predetermined number is less than a number of said block areas; and transfer means for transferring the received data stored in said RAM to said floppy disk, wherein said transfer means starts the transfer operation when said determination means determines that the predetermined number of blocks of data has been stored in said RAM, and wherein said reception means receives the data from the sending party during the transfer operation.

5. A facsimile apparatus according to claim 4, wherein said floppy disk is detachable from said facsimile apparatus.

6. A facsimile apparatus comprising:

reception means for receiving data from a sending party;

internal storage means, having a plurality of block areas each capable of storing a block of data, for storing the data continuously received by said reception means in respective block areas as blocks of data;

external storage means for storing said blocks of data stored in said internal storage means;

detection means for detecting whether or not said external storage means is available to store data;

determination means for determining whether or not a predetermined number of blocks of data has been stored in said internal storage means, where the predetermined number is less than a number of said block areas; and transfer means for transferring the received data stored in said internal storage means to said external storage means, in accordance with a result of detection by said detection means and a result of determination by said determination means, wherein said internal storage means stores the received data independently of whether said transfer means is currently capable of performing the transfer operation, and said transfer means starts the transfer operation when said determination means determines that the predetermined number of blocks of data has been stored in said internal storage means in a case where said external storage means is available.

7. The apparatus according to claim 6, wherein said external storage means is detachable from the apparatus.

8. The apparatus according to claim 6, wherein said external storage means comprises a non-volatile storage medium.

9. The apparatus according to claim 6, wherein said internal storage means includes means for detecting an overflow of said internal storage means, and continues the storing operation of the received data until the overflow of said internal storage means is detected, and wherein said reception means terminates the reception operation as a communication error in response to the overflow of said internal storage means.

10. A data reception method adapted to a facsimile apparatus having an internal storage medium, including a plurality of block areas each capable of storing a block of data, and an external storage medium, comprising:

a reception step of receiving data from a sending party;

a first storage step of storing the data continuously received in said reception step in respective block areas as blocks of data in the internal storage medium;

a first detection step of detecting whether or not the external storage medium is available to store data;

a determination step of determining whether or not a predetermined number of blocks of data has been stored in the internal storage medium, where the predetermined number is less than a number of said block areas;

a transfer step of transferring the received data stored in the internal storage medium to the external storage medium, in accordance with a result of detection in said first detection step and a result of determination in said determination step, and a second storage step of storing the transferred data in the external storage medium; and wherein said first storage medium stores the received data in the first storage step independently of whether said transfer step is currently capable of being performed, and said transfer step starts the transfer operation when said determination step determines that the predetermined number of blocks of data has been stored in the internal storage medium in a case where the external storage medium is available.

11. The method according to claim 10, wherein the external storage medium is detachable from the apparatus.

12. The method according to claim 10, wherein the external storage medium comprises a non-volatile storage medium.

13. The method according to claim 10, further comprising a second detection step of detecting an overflow of the internal storage medium, wherein said first storage step continues the storing operation of the received data until the overflow of the internal storage medium is detected in said second detection step, and said reception step terminates the reception operation as a communication error in response to the overflow of the internal storage medium.

* * * * *